United States Patent
Owen

[15] 3,688,623
[45] Sept. 5, 1972

[54] LAMINATED BUILDING BOARDS

[72] Inventor: Ian Thornton Owen, Stockton-on-Tees, England

[73] Assignee: Imperial Chemical Industries Limited, London, England

[22] Filed: April 7, 1970

[21] Appl. No.: 26,336

[30] Foreign Application Priority Data

April 10, 1969 Great Britain..........18,388/69

[52] U.S. Cl. ...................83/294, 83/319, 83/362, 83/364, 83/371
[51] Int. Cl. .............................................B23d 45/20
[58] Field of Search........83/294, 371, 364, 362, 319

[56] References Cited

UNITED STATES PATENTS

| | | | |
|---|---|---|---|
| 2,652,864 | 9/1953 | Anguera | 83/371 X |
| 2,840,163 | 6/1958 | Fischer | 83/371 |
| 3,121,360 | 2/1964 | Hill | 83/371 X |

*Primary Examiner*—James M. Meister
*Attorney*—Cushman, Darby & Cushman

[57] ABSTRACT

A device for sensing the foam-filled gap between successive discrete bottom facing sheets of a moving continuous foam laminate, the device comprising a long reference feeler and a short penetrating feeler spring against and monitoring the under surface of the laminate, the penetrating feeler being adapted to spring upwardly into the foam-filled gap thereby moving relatively to the reference feeler, means for detecting such relative motion and, after a predetermined delay, for actuating cross-cutting means for cutting the foam in register with the ends of the discrete bottom facing sheets.

12 Claims, 2 Drawing Figures

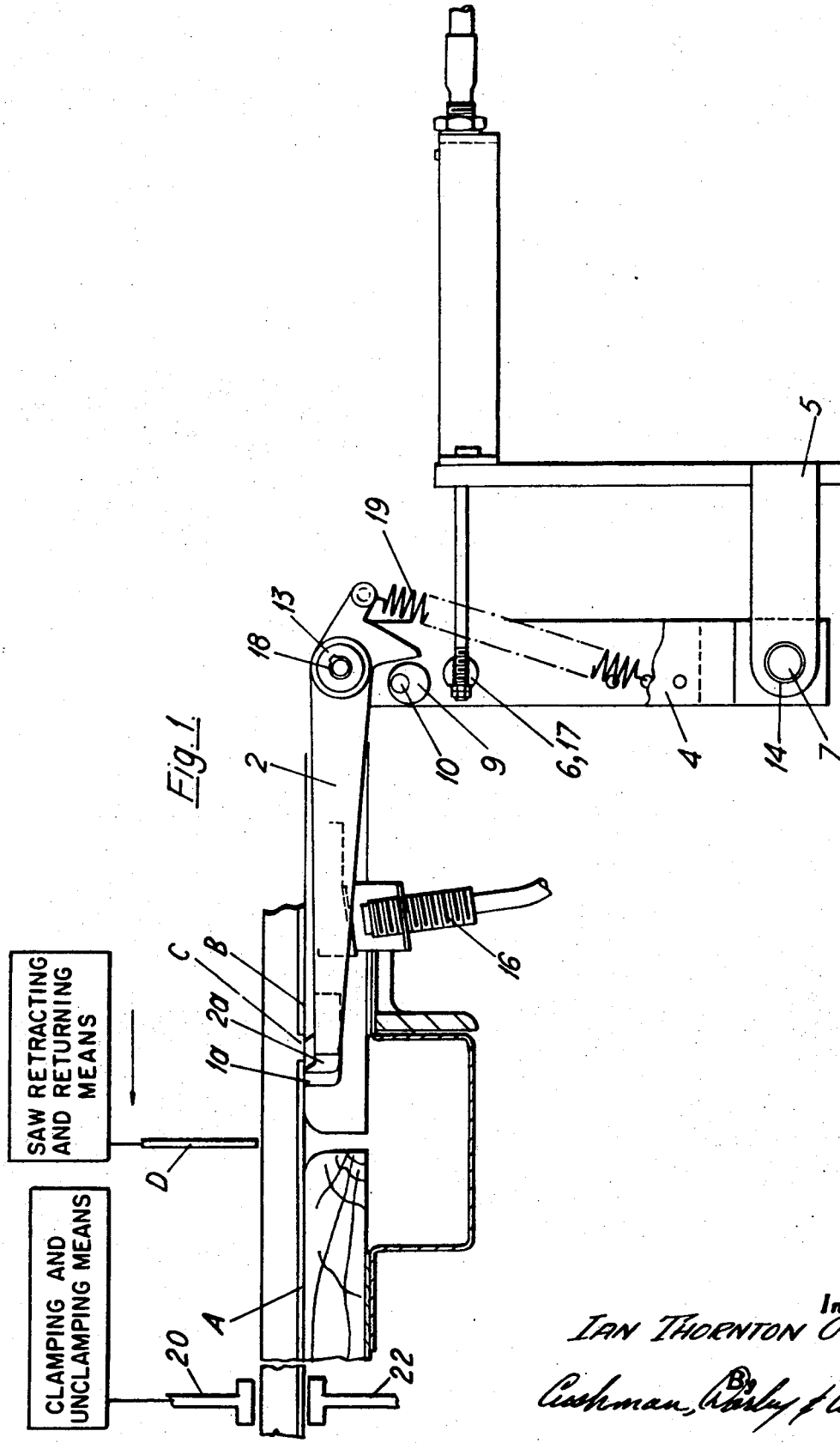

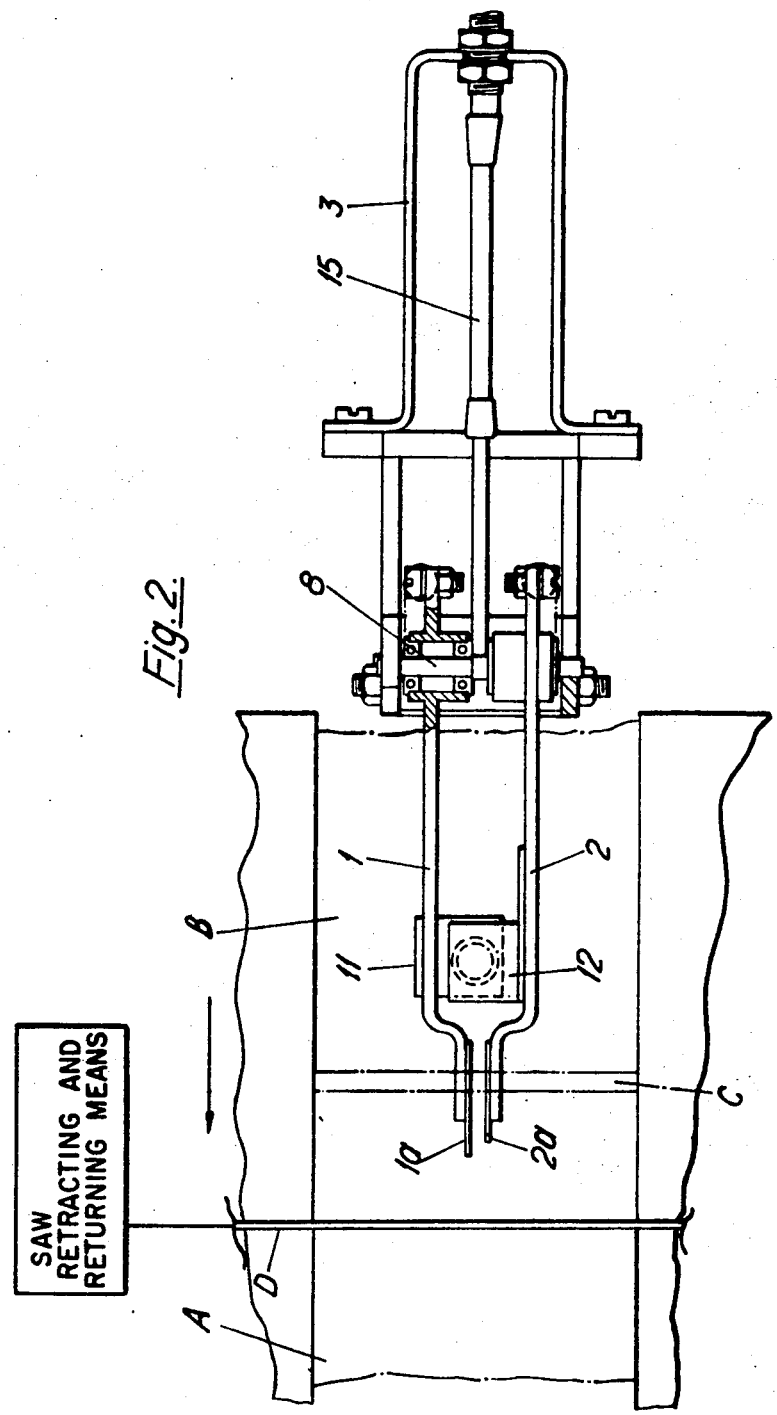

LAMINATED BUILDING BOARDS

The present invention relates particularly, but not exclusively, to foam laminates of the kind comprising a rigid layer of foam (in particular foamed polyurethane) confined between two facing sheets. Foam laminates of the kind described are useful as light-weight structural units and insulating material (e.g. in the building and packaging industries), and various processes for their manufacture have been proposed, for example in prior British Pat. Nos. 997,086, 1,098,472, 1,098,473 and 1,053,192.

The present invention is particularly applicable to foam laminates of the kind described wherein at least the bottom facing sheets consist of pre-cut discrete sheets of material (as opposed to coil stock materials), although it may also be used when the upper facing sheets also consist of pre-cut discrete sheets of material, or when the bottom facing sheet is a coil stock material (in the latter instance to detect any unacceptable unevenness in the bottom facing sheet of the laminate).

The primary purpose of the invention is to sense the foam-filled gap between successive discrete bottom facing sheets of a moving, continuous foam laminate and, responsive to sensing such a gap, automatically to actuate (if necessary, after a predetermined delay) a saw or like cutting means having a cross-cutting action which slices through the foam-filled gap in register with the ends of the discrete bottom facing sheets to produce individual laminates. (The invention is also applicable to cases where the successive discrete bottom facing sheets of a continuous laminate overlap or underlap one another, or where, for some reason, the bottom facing sheet of a laminate is so uneven as to make the laminate unacceptable, in which case the saw will cut out the unacceptable portion of the laminate, which may then be discarded).

From the foregoing, it will be evident that, in its widest application, the present invention is concerned with monitoring the continuity and (within a pre-selected tolerance) the evenness of the under-surface of a substantially flat, substantially rigid, moving article, such as a board or the like. In its broadest form, therefore, the invention provides a device for sensing discontinuity or unacceptable unevenness of the under-surface of a substantially flat, substantially rigid, moving article, the device comprising substantially parallel first and second arms sprung against the moving under-surface of the article, each of the independently of the other about a fulcrum at one end of the arm, the other end of the first arm being provided with a relatively long and thin reference feeler and the other end of the second arm being provided with a very short and thin penetrating feeler, both the feelers being sprung against and continuously monitoring the moving under-surface of the article, the arrangement being such that when a discontinuity or unacceptable unevenness in the under-surface is encountered the reference feeler and the penetrating feeler are caused to move relatively to each other so that there is relative motion between the two arms, means for detecting such relative motion and, responsive thereto, for actuating a saw or like cutting means, located or adapted to be moved to a position above or beside a cutting gap, to cut through the article substantially transversely to the direction in which it is moving.

As indicated above, however, the invention is particularly applicable to foam laminates of the kind described wherein at least the bottom facing sheets consist of discrete sheets of material. In this application of the invention, the "moving article" may be a continuous rigid layer of foam with a continuous or discontinuous upper facing sheet and a plurality of successive discrete bottom facing sheets which may either overlap or underlap one another, or be separated from each other by a relatively narrow foam-filled gap. In the latter case, the under-surface of the continuous laminate will consist of relatively long discrete sheets of facing material, each separated by a narrow gap filled with foam. Assuming the under-surface of the facing material to be substantially even, there will be no relative motion between the two feelers until the trailing end of a bottom sheet, followed by a foam-filled gap, is substantially directly above them; the longer reference feeler will not, at first, spring upwardly (and, indeed, it may not do so at all if the gap is narrow) but the short penetrating feeler will immediately detect the trailing end of the discrete bottom sheet of facing material and will spring upwards into the following foam-filled gap. This relative motion of the feelers is detected by the relative motion detecting means, which thereupon initiates the cutting action of the saw or like cutting means.

It will be appreciated that there is necessarily a time-lag between the relative motion of the feelers taking place and the actual cutting of the foam, so that in the finished individual laminates the end of the discrete bottom facing sheet and its foam core are not in register. To overcome this, the saw or like cutting means and the cutting gap may be situated a pre-determined distance forward of the foam-filled gap, or the saw may be provided with clamps or the like gripping means and the relative motion detector (responsive to the relative motion of the feelers) first actuates the clamps so that the saw is clamped to the moving laminate at a point rearwardly of the cutting gap and moves forward with the laminate until it is directly above or beside the cutting table gap, whereupon the saw is caused to slice through the foam, and by accurate positioning of the saw to do so in exact register with the trailing end of the first discrete bottom facing sheet. If the successive discrete bottom facing sheets are spaced an accurate pre-selected distance apart, the saw may be provided with a second blade which simultaneously slices through the foam in exact register with the leading end of the second discrete bottom facing sheet. After cutting, the clamps are released and the saw is retracted and returned to its original position. To ensure that the saw operates at exactly the necessary moment to ensure such correct registration, the device may be provided with a delay mechanism which may, for example, be based upon accurate measurement of the length of the product laminate or (where the continuous laminate is travelling at a pre-determined constant speed) upon an accurate timing device.

The invention is also applicable to the case where the successive discrete bottom facing sheets are overlapped or underlapped. By "overlapped", we mean that the end of the first facing sheet lies below the adjacent end of the succeeding facing sheet; in this case, the penetrating feeler will be the first feeler to move (upwardly) and the saw should be located or moved to a cutting position which is at a preselected distance forward of the forward end of the lapped portion in order to obtain correct cutting registration. By "underlapped", we mean that the end of the first facing sheet lies above the adjacent end of the succeeding facing sheet; in this case, the reference feeler will be the first feeler to move (downwardly) and the saw should be located or moved to a cutting position which is at a preselected distance forwards of the rear end of the lapped portion in order to obtain correct cutting registration. As an alternative to relocating the saw, the sensing device may be correspondingly re-locatable (but in the opposite direction) at will; that is to say the saw remains stationary but the sensing device is so located with respect to the moving laminate that the saw cuts exactly in register with the leading end of the second facing sheet (in the case of overlapping) or exactly in register with the trailing end of the first facing sheet (in the case of underlapping).

One embodiment of the invention is hereinafter described with reference to the accompanying drawings, wherein:

FIG. 1 is a diagrammatic side view of a sensing and cutting device according to the invention; and FIG. 2 is a plan view of FIG. 1.

As illustrated, A and B represent successive discrete bottom facing sheets of a continuous foam laminate panel moving in the direction of the arrow, away from a laminating machine (not shown). C represents the foam-filled gap between the successive bottom facing sheets A, B, and D represents a cross-cutting circular saw which, in the position illustrated, is in register with a cutting gap in or adjacent to an underlying cutting table. Although shown above the cutting gap, it will be appreciated that the saw may be located to one side thereof.

As illustrated, a pair of arms, 1 and 2, are sprung against the underside of the second (or trailing) bottom facing sheet B of the foam laminate, each of the arms being independently pivotable on ball-bearings 13 about a fulcrum pin 8, which is held in position by a circlip or the like 18 on a pivotable supporting member 4, the lower end of which is provided with a bush 14 in which is positioned a pivot shaft 7. The bush 14 is located in a bracket or the like by which it is connected to a base support 5 which is bolted or otherwise secured to the main body of the laminating machine.

At the ends thereof remote from the fulcrum pin 8, the arms 1 and 2 are provided, respectively, with a relatively long and thin reference feeler 1a and a very short and thin penetrating feeler 2a. At its other end, each of the arms 1 and 2 is spring-loaded by means of springs 19 (the spring for the arm 2 preferably being stronger than that for the arm 1) so that the reference feeler 1a and the penetrating feeler 2a are spring-biassed upwardly against the underside of the first (or leading) bottom facing sheet A of the foam laminate. The stress which each feeler applies to the underside of the bottom facing sheet A is, in both cases, insufficient to mark or indent said facing sheet but, by virtue of its smaller area (and, conveniently, by its stronger spring-loading) the stress applied by the penetrating feeler 2a exceeds the strength of the foam in the gap C, whereas the lower stress applied by the reference feeler 1a does not.

It is obvious, therefore, that if the uncut laminate were suddenly removed, the arms 1 and 2 would pivot upwardly (the arm 2 to a greater degree than the arm 1, assuming that its spring 19 is stronger than the spring 19 for the arm 1) but the extent to which they are allowed to pivot upwardly is conveniently controlled, at least partially, by an eccentric stop 9 which is located on the pivotable supporting member 4 by a locating bolt 10. The eccentric stop 9 also serves, during normal monitoring of the bottom sheet, to maintain the arms 1, 2 in the substantially horizontal position shown.

If one imagines the uncut foam laminate moving towards the left in FIG. 1, the stage will be reached where there is no bottom facing sheet A or B, but only the foam in the gap C, immediately above the reference feeler 1a and the penetrating feeler 2a. Owing to the length of the reference feeler 1a and the fact that it cannot, in any case, penetrate the foam in the gap C, the reference feeler 1a (and, of course, the remainder of the arm 1) does not pivot upwardly; on the other hand, the short sharp penetrating feeler 2a can and does pivot upwardly and penetrates the foam in the gap C, e.g., to about 0.1 inch. There is therefore a relative motion between the reference feeler 1a and the penetrating feeler 2a which is detected by the sensing head of an inductive proximity limit switch 16 (for example of the kind sold under the trade name "SIMPLEX" by General Electric Company of U.S.A.), or a micro-switch or other relative motion detector. (As the continuous laminate continues to move forward, the feeler 2a is pulled out of the foam and presses upwardly against the under-surface of the succeeding bottom sheet B). In the embodiment illustrated, the inductive proximity limit switch 16 is secured to the arm 2 by a bracket 12 and a metal member 11 is attached to the arm 1 to enable the inductive proximity limit switch 16 to detect movement of the arm 1 relative to the arm 2. When this relative movement exceeds a preselected value (i.e., when it is clear that it is due to the feeler 2a penetrating the foam in the gap C and not merely to some very slight unevenness in the underside of the bottom facing sheet A) the inductive proximity limit switch 16 initiates the operation of the saw D which slices through the foam in the gap C, thereby cutting the laminate into two separate laminates. Clamps 20 and 22 are provided adjacent to the saw D for gripping and moving forward with the laminate. After the laminate is cut the clamps are released by the clamping and unclamping means and the saw D is retracted to its original position by the saw retraction means.

As described hereinabove, in order to ensure that the saw D slices through the foam gap C in exact registration with the trailing end of sheet A, the inductive proximity limit switch 16 preferably first clamps the saw D to the moving laminate and, after a predetermined delay, during which the saw has reached the position shown in the drawings, and the forward end of the foam gap has reached a position substantially directly beneath it, causes the saw to slice through the foam gap C exactly in registration with the trailing end of the bottom sheet A, and thereafter retracts and unclamps the saw and returns it to its original position; the use of a double-bladed saw makes it possible also simultaneously to slice through the foam gap C exactly in registration with the leading end of the bottom sheet B. The above-mentioned "predetermined delay" may, for example be integrally incorporated in the inductive proximity limit switch 16.

It will be appreciated that the relative movement of the arms 1 and 2 will be sensed, and the saw actuated, not only when the gap C is filled with foam and when any unacceptable unevenness is detected in the bottom facing sheet A, but also when the bottom facing sheets A and B overlap or underlap one another (as described hereinabove).

The whole of the sensing device is preferably adapted to be located (and its location altered at will) by a positioning control cable 15 which is supported by a suitable support 3; one end of the control cable 15 is therefore connected to an anchorage point 6 which is mounted on the pivotable supporting member 4 by a circlip or the like 17. By actuation of the control cable 15, the pivotable supporting member 4 is caused to pivot, one way or the other, upon the main pivot shaft 7, thereby altering the location of the sensing device to any predetermined degree, and thereby providing a predetermined delay between the sensing of relative motion between the arms 1, 2 and the actual cutting by the saw; this is particularly useful when the sheets A and B are either overlapped or underlapped. A similar effect can be obtained by altering the original position of the saw D to a predetermined degree.

I claim:

1. A device for sensing discontinuity and unacceptable unevenness of the under-surface of a substantially flat, substantially rigid, moving article, the device comprising substantially parallel first and second arms sprung against the moving under-surface of the article, a fulcrum about which one end of each of the arms is pivotable independently of the other, a relatively long and thin reference feeler, provided at the other end of the first arm, a very short and thin penetrating feeler being provided at the other end of the second arm, means for holding both the feelers sprung against, and thereby continuously to monitor, the moving under-surface of the article, so that when a discontinuity and unacceptable unevenness in the under-surface is encountered the reference feeler and the penetrating feeler, and the two arms, are caused to move relatively to each other, means for detecting such relative motion, cutting means adapted to cut through the article, responsive to detection of such relative motion, substantially transversely to the direction in which the article is moving.

2. A device as claimed in claim 1, wherein said article is a continuous foam laminate with discrete bottom facing sheets, successive sheets being separated from each other by a foam-filled gap.

3. A device as claimed in claim 1, wherein said article is a continuous foam laminate with discrete bottom facing sheets, successive sheets being overlapped with respect to each other.

4. A device as claimed in claim 1, wherein said article is a continuous foam laminate with discrete bottom facing sheets, successive sheets being underlapped with respect to each other.

5. A device as claimed in claim 1, wherein said means for detecting relative motion between the two arms comprises an inductive proximity limit switch.

6. A device as claimed in claim 1, wherein said means for detecting relative motion between the two arms comprises a microswitch.

7. A device as claimed in claim 1, wherein the penetrating feeler is more strongly sprung than the reference feeler against the under-surface of the moving article in order to accentuate relative motion between the arms.

8. A device as claimed in claim 1, including means for delaying, to a predetermined degree, the cutting action of the cutting means after detection of relative motion between the arms, so that the moving article is cut at a predetermined point.

9. A device as claimed in claim 8, including means responsive to the detection of relative motion between the arms for clamping the saw or like cutting means to the moving article so that the cutting means moves with the article up to the predetermined point and for thereupon causing it to cut the article.

10. A device as claimed in claim 9, including means for subsequently unclamping the cutting means, retracting it and returning it to its original position.

11. A device as claimed in claim 8, wherein the delaying means is integrally incorporated in the means for detecting relative motion between the arms.

12. A device as claimed in claim 8, wherein the delaying means comprises means for altering the position of the feelers relative to the predetermined cutting point.

* * * * *